United States Patent Office 2,764,528
Patented Sept. 25, 1956

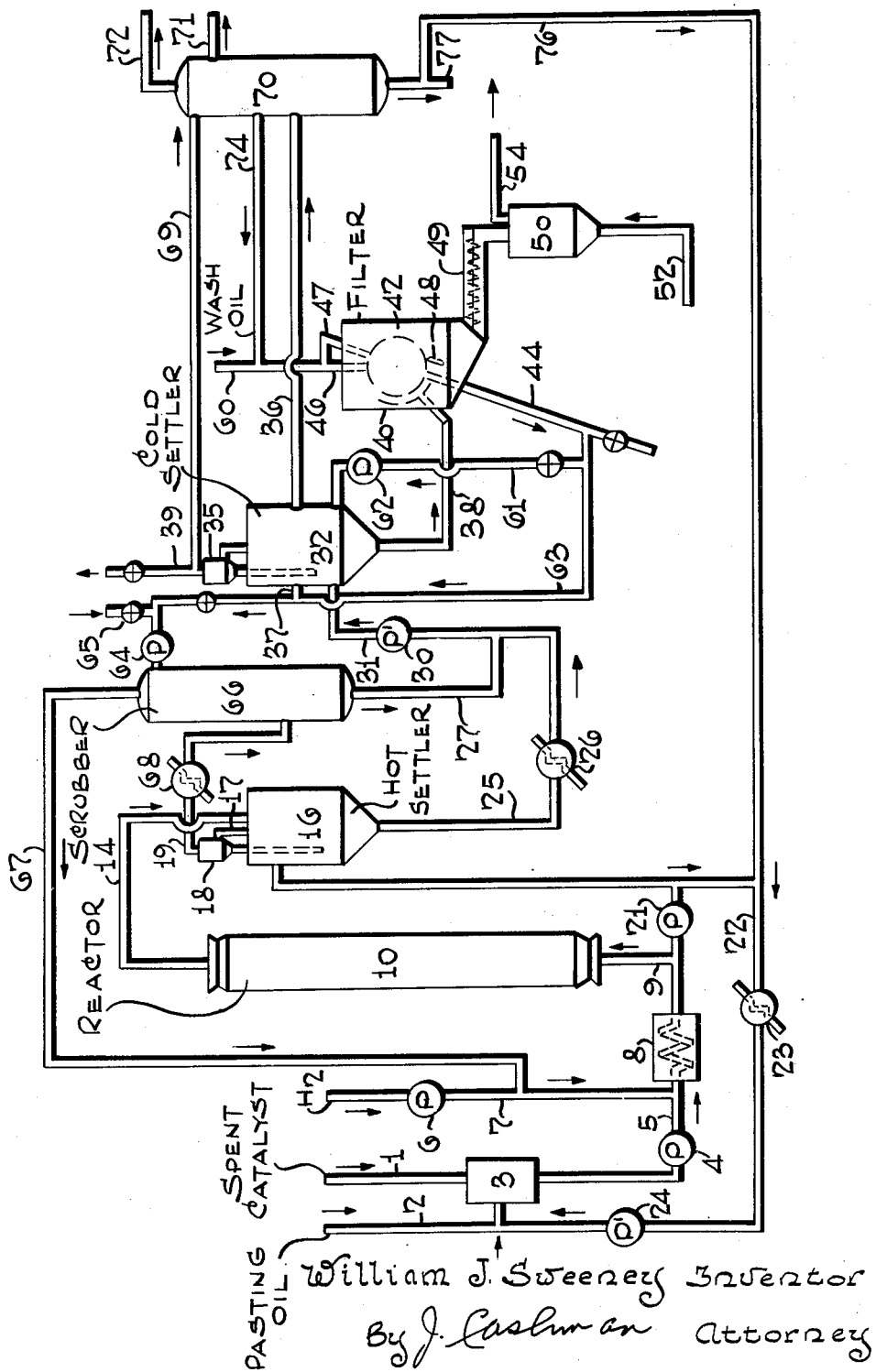

2,764,528

CATALYST REGENERATION PROCESS

William J. Sweeney, Summit, N. J., assignor to Esso Research and Engineering Company, a corporation of Delaware Application January 9, 1952, Serial No. 265,615

6 Claims. (Cl. 196—50)

This invention relates to a process for removing carbonaceous deposits from a highly active hydrocarbon conversion catalyst comprising a platinum group metal supported on a suitable base. More particularly it relates to a process for removing such deposits employing high pressure hydrogenation in the liquid phase.

The use of highly active catalysts of the general type of platinum supported on an active alumina base has shown definite advantages over less active catalysts in various hydrocarbon conversion processes. Such catalysts have been found to be particularly useful in the conversion of hydroaromatic naphthenes to aromatics. They are also effective catalysts for the isomerization of straight chain or moderately branched paraffins into an equilibrium mixture including a high proportion of more highly branched isomers. Reactions of this type can be employed in the conversion of selected narrow boiling hydrocarbon fractions into other more desirable compounds. They have been found particularly useful, however, in the treatment of relatively wide boiling fractions of low octane number to produce reformed naphthas of higher octane value.

The use of these catalysts in naphtha treating has been found most valuable under hydroforming conditions. In this operation, naphtha vapors are fed continuously under a relatively high partial pressure of hydrogen into a reaction zone containing the hydroforming catalyst, under reaction conditions such that there is little or no hydrogen consumption and ordinarily a net production of hydrogen in the process. When treating a naphtha fraction with one of the highly active platinum type catalysts under such hydroforming conditions at an operating pressure of about 500–1000 pounds, it has been found possible to convert naphthas of very poor quality, having initial octane values of 50–60 O. N. or less, into good quality products having an octane value of 88–90 by the ASTM research method of test. Further experience has shown that a decrease in operating pressure from about 750 to from about 50 to 400 pounds results in a very significant further increase in the octane value of the product, which may be as high as 95–100 research O. N.

The typical high pressure process using these catalysts, operating at about 750 pounds, has no marked effect on catalyst activity over a prolonged period of time. Where products of moderately high octane value are satisfactory, this process has the advantage that there is no significant amount of catalyst contamination of the catalyst surface by carbonaceous deposits under these conditions. The higher quality product obtained at typical low pressure conditions of about 200 pounds pressure thus suffers from a comparative disadvantage, in that under these conditions a carbonaceous deposit is formed on the catalyst, and catalyst activity falls off with time.

Various proposals have been made to remove the carbonaceous deposits formed on these platinum-type catalysts under low pressure hydroforming conditions. It has been found preferable in some cases, where possible, to remove this deposit by a simple hydrogenation. Thus, under certain conditions a spent platinum-containing hydroforming catalyst may be restored to essentially its original activity by cutting off the naphtha feed to the reaction zone and continuing the supply of hydrogen at substantially the normal operating pressure for various periods of time. It has also been proposed to regenerate these catalysts by controlled oxidation to remove the carbonaceous deposits from the catalyst surface.

Experience has shown that with many naphtha feed stocks the hydrogenation procedure does not always fully restore the catalyst to original activity. In this event there is a gradual increase in the amount of residual carbon or coke on catalyst after successive regenerations, and a corresponding gradual decrease in catalyst activity. Oxidative regeneration is more successful in removing the residual carbon, but the platinum-type metals are such active catalysts for the combustion process that it has been found very difficult to avoid causing localized changes in the catalyst surface structure which gradually result in their deactivation for the hydroforming reaction.

Experience with these catalysts has shown that they are particularly likely to become contaminated with coke deposits under conditions where the hot catalyst comes in contact with liquid oil. This is taken as further evidence of the very high activity of this particular catalyst composition. Its dehydrogenating activity is apparently such that various constituents of such a liquid hydrocarbon oil may be broken down to polymerizable materials which go rapidly to coke, when such reactions take place on the catalyst surface at ordinary hydroforming reaction temperatures.

The surprising result has now been found that these highly active catalysts can be satisfactorily regenerated in a liquid phase process, using high hydrogen pressures of the order of 1000–10,000 pounds per square inch. In order to accomplish this, however, it is necessary that the liquid oil present at the time when the high hydrogen partial pressure is released from the cooled regenerated catalyst be one which has a relatively low content of those constituents which might most readily undergo such a polymer-coke formation on dehydrogenation.

The process of the present invention consists essentially of a high pressure reaction for the hydrogenation of a thin slurry or suspension containing from about 5% to 30% of spent platinum metal catalyst, suspended in a suitable high boiling oil. The total product from this reaction zone is passed through a series of settling devices to permit the recovery of a recycle stream of suspending oil, providing a separate wash oil cycle to remove residual suspending oil from the catalyst prior to the final release of hydrogen pressure. The washed regenerated catalyst is finally resuspended in a stream of hot hydrogen. The entire operation is carried out in the presence of hydrogen partial pressures of about 200 p. s. i. g. or higher, and all process streams are cooled prior to that part of the process which takes place at pressures below about 1000 pounds per square inch.

Various means may be employed to carry out the desired separation and washing procedures. One specific type of apparatus which may be employed is shown in detail, by way of illustration, in the attached drawing.

In the drawing, vessel 10 is a diagrammatic representation of a high pressure hydrogenation reactor adapted to receive a liquid slurry of spent hydroforming catalyst in a pasting oil, introduced through line 8. The catalyst slurry in line 8 is made up from spent catalyst introduced through line 1 and pasting oil introduced through line 2 into the mixing or pasting vessel 3. The operating pressure in vessel 3 may be substantially the same as that in a hydroforming operation from which the spent catalyst in line 1 is withdrawn, in a hydrogen atmosphere which may be about 200 lbs. of hydrogen partial pressure. This hydroforming operation forms no part of the present invention, and is not shown in the drawing. The mixing of spent catalyst and pasting oil may be carried out continuously, with properly proportioned flows of catalyst and oil through lines 1 and 2. Under other circumstances it may be desirable to carry out this operation batchwise, providing two or more pasting vessels 3 so that the charge of oil and catalyst may be separately introduced and mixed in this vessel prior to passing this slurry to reactor 10.

The total pressure on the catalyst/oil slurry introduced into reactor 10 is brought up from the pressure in vessel 3 by the high pressure slurry pump 4 in line 5. A high pressure stream of hydrogen fed through pump 6 and line 7 is then introduced into line 5 and the combined stream is passed through heater 8 where it is raised to reaction temperature at reaction pressure before passing through line 9 into the reaction vessel 10. Reactor 10 is adapted for liquid phase operation in the pressure range of 1,000–10,000 lbs. per square inch, at a temperature of about 600°–900° F.

The total product, including liquid oil, catalyst and dissolved gases, is removed overhead from reactor 10 through line 14 and passed to a hot settler 16, operating at reactor pressure. In this settler the major portion of the product gases, including substantial quantities of hydrogen, is removed overhead through line 17. The gas passes through a suitable separating device such as a cyclone separator 18 having a gas exit line 19, which returns entrained solid particles to the liquid phase in settler 16. The liquid phase stratifies to a certain extent, giving a relatively clear supernatant oil layer and a slurry of catalyst in oil at the bottom of the settler. A portion of this supernatant oil, containing relatively little catalyst in suspension, is withdrawn as a side stream through line 20 and returned as a recycle pasting oil. This oil may be returned in part to slurry feed line 9, in which case the circulating pump 21 operating at a low pressure differential may be supplied in line 20 to compensate for the pressure drop through vessel 10, settler 16 and the connecting lines. A part or all of this clarified oil may also be circulated through line 22 back to the pasting oil feed line 2. In this case it is necessary to depressure the oil stream and the stream may be cooled in exchanger 23 and passed in the reverse direction through the pump or let-down engine 24 to enter vessel 3 at the lower pressure level. Engine 24 may be coupled to pump 4 or any of various other pumps in the system, if desired, to recover useful energy for the process.

The average residence time and degree of mixing or turbulence imparted to the catalyst particles in reaction vessel 10 are controlled by the velocity of the slurry passing upward through this vessel. This velocity should preferably be kept high, in the range of about 0.5 to 1.0 ft. per second, based on the total liquid oil, catalyst and hydrogen passing upward therethrough. It may also be desirable to add plates or packing in this vessel to increase the turbulence and decrease the settling of solids therein. A suitable reaction period for the hydrogenation of the carbonaceous material of the catalyst particles in zone 10 may be from about 10 seconds to 10 minutes, or somewhat longer. The amount of hydrogen employed will depend primarily upon the character of the pasting oil, and may be from about 100 to 2000 or more cu. ft. per barrel of oil.

The chief characteristics of the pasting oil are that it must be high boiling enough to remain in the liquid phase at the reaction conditions of high temperature and high hydrogen partial pressure, viscous enough to help prevent the catalyst settling out of suspension, and sufficiently saturated that it has a low hydrogen requirement. These requirements may be met, for example, by an oil derived from the paraffin distillate fraction of a naphthenic crude oil which has an average boiling point or dew point at atmospheric pressure not lower than about 50°–150° F. below the operating temperature, depending upon the total hydrogen pressure used.

The process of this invention is particularly adapted for the regeneration of finely divided catalyst particles such as those employed in a fluid solids hydroforming process. It may also be employed, however, for the regeneration of platinum or other noble metal catalysts used in the form of pills or granules in a moving bed or fixed bed system. In this case the catalyst should preferably be ground to below about 40 mesh in size so as to pass more readily through the system.

The product slurry withdrawn through line 25 at the bottom of settler 16 has a solids content which has been increased to about 20%–40% or more by weight, corresponding to the removal of a part of the original suspending oil by way of line 20. It is desirable to keep the concentration of solids in line 22 high, to facilitate the washing step described below.

The slurry in line 25, still at operating temperature and pressure, is next cooled by passing through the oil cooled or water cooled exchanger 26, to a temperature below about 250°–500° F. The cooled slurry is diluted with a relatively large volume such as an equal volume or more of a low boiling naphthenic or paraffinic wash oil introduced through line 27. This liquid stream is now expanded through a let-down engine or valve 30 to a pressure of about 200–300 pounds, and passed through line 31 into the cold settler 32. The final temperature in settler 32 is one at which there is substantially no tendency for coke formation on the catalyst, in the presence of liquid wash oil, when the high hydrogen partial pressure is partially released in this manner. Gas evolved from the liquid stream is flashed overhead through line 34. This line may be provided with cyclone separators 35, if desired, to return the major part of any entrained solids therefrom back to the liquid in the bottom of settler 32. This liquid tends to stratify into a relatively clear upper layer of wash oil and residual slurry oil, and a thickened slurry at the bottom. The upper layer may be withdrawn as a side stream through lines 36 and 37 in a manner similar to the operation of the hot settler 16. The slurry of catalyst in oil withdrawn from the bottom of settler 32 through line 38 is preferably sufficiently dispersed to be free flowing. However, sufficient pressure drop may be taken to convey materials through line 38 so that no separate pump is required for this purpose.

The slurry withdrawn through line 38 is separated by any suitable means to give a dry catalyst powder, in a hydrogen atmosphere, to be returned to the hydroforming process. The specific means chosen for purposes of illustration in the drawing is a rotary filter, operating at substantially room temperature in an enclosed vessel under a hydrogen gas pressure of about 200 pounds per square inch. In the drawing, the slurry withdrawn from the bottom of settler 32 is impelled through line 38 by the pressure difference between settler 32 and that in filtering vessel 40. This slurry is discharged onto the surface of a rotating filter drum 42, and the mixed wash oil and slurry oil extracted from the catalyst on the surface of this filter are withdrawn through line 44. A separate stream of wash oil introduced through line 46 impinges on the filter cake on drum 42 at a point in its path of travel just beyond where it is sucked dry of the original mixed oil removed from settler 32. One or more additional wash oil injection points 47 may be employed, if desired, to give a substantially complete removal of residual slurry oil from the filter cake. The washed cake, which is scraped from the surface of the drum by a suitable scraper 48, falls to the bottom of filter box 40, from which it is removed by a suitable conveying means 49.

The washed clean catalyst removed through conveying means 49 may be stored as such in a suitable vessel 50. Preferably, it is removed from vessel 50 by injecting continuously through line 52 at the bottom of this vessel a stream of hot hydrogen-containing gas, at the temperature and pressure of the hydroforming apparatus not shown. This gas stream, which may be at about 200 pounds pressure, completes the drying of the clean catalyst and forms a suspension of catalyst in hydrogen-containing gas which may be removed overhead from vessel 50 through line 54 and conveyed directly to a fluid hydroforming operation. Alternately, vessel 50 may function as a drying vessel and dried catalyst particles may be withdrawn therefrom by any suitable means for use as a fluidized solid or for re-forming into pills or granules for use in a fixed bed or moving bed hydrocarbon conversion operation.

The wash oil used for the process of this invention is preferably one which will be readily vaporized from the surface of the catalyst under these conditions, and may be hydroformed naphtha. As indicated above, a particular requirement for this wash oil is that it should be a material which does not readily go to coke upon releasing the hydrogen partial pressure which has been used to regenerate coke originally present on the spent catalyst. The types of compounds preferred for this use are relatively low boiling hydrocarbons in the naphtha boiling range, specifically free of polycyclic constituents, and preferably containing large proportions of paraffinic and hydroaromatic constituents with little or no low boiling cyclopentane derivatives. The wash oil may contain aromatics when initially supplied to the system. In this case, these compounds will be hydrogenated promptly to the corresponding cyclohexanes which then can be recycled with other portions of the wash oil, as desired.

The small amount of naphtha fraction which may be produced by partial hydrocracking of the high-boiling pasting oil in vessel 10 has a composition which renders it quite suitable for use as a wash oil in the process. Since the wash oil may be recycled continuously through the system with very little loss, as indicated below, only a small amount of fresh oil need be provided as make-up. Thus the system may be started up with an extraneous supply of wash oil which is then discontinued, additional make-up for the wash oil cycle being supplied solely in the form of light naphtha derived from the hydrogenation.

Fresh wash oil from any suitable source is introduced first into line 60 feeding lines 46 and 47 in the filter system. The wash oil issuing from the filter through line 44 is substantially free of regenerated catalyst particles, and a portion of this stream including any excess wash oil in the system may be withdrawn from line 44 for use elsewhere. Another portion may be recirculated through line 61 to settler 32, with the aid of circulating pump 62, to help thin the slurry in this settler and reduce the concentration of pasting oil therein. The major part or all of this stream may be conveyed through line 63, with the aid of pump 64, and introduced into high pressure scrubber 66 where it contacts the gas stream issuing from hot settler 16 through separator 18 and line 19. Additional wash oil containing a somewhat higher concentration of slurry oil than the mixture in line 44 may be withdrawn as the clarified oil from settler 32, by way of line 37, and introduced into line 63 if desired.

Scrubber 66 operates at the pressure of reactor 10 and settler 16, while filter 40 operates at the lower pressure of settler 32. The pressure differential between these two parts of the system is made up in pump 64, which may be coupled with let-down engine 30 in line 27 to supply a substantial part of its power requirements.

Scrubber 66, together with separator 18, serves to remove suspended catalyst fines from the gas stream issuing from settler 16 and convey these fines to filter 40 so that they are not unnecessarily recycled through the system. At the same time this high pressure scrubbing removes from the gas stream in line 19 a substantial portion of the methane as well as other light hydrocarbons present. The gas stream issuing from the top of scrubber 66 through line 67 can thus serve directly as a hydrogen recycle to reactor 10. The fat wash oil from the bottom of scrubber 66, including any light hydrocarbons produced in vessel 10 and taken overhead from settler 16, passes through line 27 where it joins the slurry of catalyst and suspending oil removed from the bottom of settler 16.

The wash oil supplied through line 63 is at a relatively low temperature compared to the reaction temperature in zone 10. This tends to cool the gas in line 19 entering scrubber 66, giving an improved gas absorption capacity. Heat exchanger 68 in line 19 may also be provided to cool this gas stream further, as may be desired, to aid in the control of the absorption temperature. Fresh wash oil may be supplied through line 65 to supplement or replace entirely the mixed wash oil and slurry oil in line 63, coming from line 44 and filter 40. In certain cases, depending upon the relative amounts of normally gaseous and other light hydrocarbons produced in vessel 10, it may be possible to dispense entirely with the addition of wash oil at the top of vessel 66, which operates in this case as a fractionating tower to separate recycle hydrogen from a high pressure condensate which passes through line 27 and serves as the first diluent for the slurry in line 25.

The fat oil from the absorption tower or scrubber 66 contains catalyst fines scrubbed out of the gas in line 19, as well as light hydrocarbons absorbed therefrom. The catalyst fines in this stream become a part of the total solids in the slurry in line 31, feeding into settler 32. The lightest hydrocarbons in the fat oil are flashed off in settler 32, together with large quantities of hydrogen, and these gases pass together through line 69 into distillation column 70. The major portion of the wash oil, however, remains in the liquid phase in vessel 32. Part of this oil is removed from settler 32 with the supernatant oil layer withdrawn through lines 36 and 37 which is preferably allowed to settle first so as to remove substantially all of the suspended catalyst particles therefrom. The mixture of wash oil and slurry oil in line 36 is fed into distillation column 70 and suitable piping arrangements not shown in the drawing may be employed to heat this stream by heat exchange with either the hydrogen recycle gas stream in exchanger 68, the clarified oil in exchanger 24 or the catalyst slurry in exchanger 28. Other conventional arrangements, not shown, may be employed to supply heat to this column if necessary.

In distillation column 70, which operates at the pressure of settler 32, the light gases from line 69 may be completely freed of $C_4$ hydrocarbons. A separate fraction of $C_4$, $C_3$, $C_2$ or other light hydrocarbons may be recovered through line 71, if desired, taking advantage of the operating pressure available in the system. The overhead gas stream shown as line 72 in the diagram may thus be controlled to consist essentially of hydrogen and methane, which may be used directly or after suitable reforming treatment as a source of fresh hydrogen supply through line 7 to the hydrogenation vessel 10. The light hydrocarbons removed at 71, shown diagrammatically as a single line in the drawing, may be recovered separately as part of the distillation products and used as such, or reformed as a source of additional hydrogen. A side stream of suitable boiling range is withdrawn from tower 70 through line 74, and fed to line 60 as fresh wash oil.

The bottoms fraction from tower 70 may be recycled through line 76 directly to line 6 as a source of suspending oil for the catalyst slurry made up in pasting vessel 2. A small portion of this recycle stream may be bled off through line 77 from time to time or continuously, if necessary, to prevent the building up of undesirable constituents in the system. Ordinarily, however, the hydrogenation process taking place in vessel 10 breaks carbonaceous deposits on the catalyst down completely into light hydrocarbons which are removed from the system or recycled as part of the overhead or distillate fractions from tower 70.

In the normal operation where the bottoms of tower 70 are recycled through line 76 and line 6, residual catalyst fines removed from settler 32 with the oil and gas withdrawn through lines 36 and 69 are returned thereby to vessel 2. The only disadvantage this involves is an extra recycle of a small amount of catalyst through the system. The rate of withdrawal of purified oil through line 36 is controlled with this in mind. Additional settling capacity, not shown, may be provided to return entrained catalyst from line 36 to the slurry in line 38, thus permitting a higher rate of separation without entraining an excessive amount of catalyst into tower 70 and recycle line 76. The fresh wash oil stream or recycled wash oil passing through line 60 to the filtering system can also be used to scrub entrained catalyst fines from the gas in line 69, thus saturating this wash oil with hydrogen at the same time, and a special scrubbing vessel may be provided for this purpose if desired.

A specific example of a regeneration process according to the present invention will now be given by way of illustration:

*Example*

A finely divided fluid catalyst comprising 0.5 wt. percent of platinum on an active alumina stabilized with about 5 weight percent silica, employed in a conventional low-pressure hydroforming process for the conversion of a 200° to 330° F. heavy virgin naphtha, gives initially a product of about 95 clear research octane number. The catalyst circulates continuously through a fluid bed in the hydroforming reactor, where it contacts the feed naphtha vapors at 900° F. under a total gas pressure of 200-220 P. S. I. G., containing about 80-85 mol percent hydrogen. Spent catalyst withdrawn from the hydroforming reaction zone passes to a second fluid bed in a separate hydrogen regeneration zone, operating at the same hydrogen pressure and temperature as the hydroforming zone but in the absence of the naphtha feed. The hydrogen regeneration removes the major part of the carbonaceous deposit laid down on the catalyst during low pressure hydroforming and the regenerated catalyst is returned to the hydroforming zone.

This catalyst retains satisfactory activity over a long period of time. However, experience has shown that in case of a temporary upset in the hydrogen regeneration process, or where the carbon level is allowed to build up gradually during continued use, it is no longer possible for low pressure hydrogen regeneration to restore the spent catalyst to a satisfactory activity level. Thus, these catalysts have gone off in activity in various cases where heavy ends were present in the recycle hydrogen used for the regeneration, or where naphthas having a high proportion of heavy ends were fed over a period of several hundred hours. Under these conditions the catalyst which originally gave a product of about 95 clear research octane number is no longer able to give a product of better than about 90 octane number by the same method of test.

This spent catalyst is then withdrawn from the hydroforming unit, and mixed with a pasting oil consisting of an 800° mid boiling point narrow cut fraction of coastal crude oil, having an atmospheric boiling range of about 750°-850° F. The catalyst and oil are mixed in a hydrogen atmosphere corresponding to the operating pressure of the hydroforming process, in proportions to give a slurry containing 10 wt. percent of solid. This slurry is then combined with hydrogen in the amount of 500 cu. ft. per barrel of oil, and raised to 3000 lbs. operating pressure in a slurry pump. The slurry is then heated to 800° F. and passed through a long vertical reactor at an upward velocity of 1 ft. per second, allowing an average contact time of about 60 seconds for the hydrogenation process to be completed.

The slurry issuing from the top of the reaction vessel passes first to a hot settler operating at 800° F. and 3000 lbs. pressure, where hydrogen and light hydrocarbons present are removed overhead. The overhead stream from this hot settler is cooled by heat exchange with fresh hydrogen feed and with water to about 100° F. The condensation of the hydrocarbon materials present in this stream removes substantially all the normally gaseous hydrocarbons present, as a solution in the high pressure hydrogen condensate, and a purified hydrogen stream is removed overhead for recycling to the system.

The hot liquid in this primary settler stratifies into a thickened slurry and a relatively clear supernatant liquid. An amount of this clarified oil equal to approximately half the original pasting oil is withdrawn and recycled to the pasting step, after passing through a let-down engine coupled to the fresh feed pump so as to maintain the desired pressure differentials in this part of the system. The remaining thickened slurry has a solids content of about 25 weight percent, part of the original pasting oil having been hydrocracked to a lower molecular weight and passing off with the overhead from the settler.

The hot slurry issuing from the bottom of the primary settler is then cooled to 200° F. and at this temperature the hydrogen pressure is released to about 250 lbs. in a second settler. In this vessel a 200° to 400° fraction of the hydroformed naphtha previously prepared by contact with the same platinum catalyst is added to the thick slurry of regenerated catalyst and pasting oil, as a wash oil, passing in a generally upward direction countercurrent to the descending stream of catalyst slurry. The amount of this wash oil is equal in volume to the amount of the thickened slurry, or about twice the volume of the slurry oil contained therein. The liquid in this second or cold settler separates again into a clear supernatant layer and a thickened slurry in which the original slurry oil has been largely replaced by the hydroformate used as wash oil. The clarified oil from this settler is fractionated to recover separate streams of wash oil and pasting oil, both of which are recycled to the system.

The slurry from the cold settler at 200° F. and 250 p. s. i. g. pressure passes through an expansion valve to a rotary filter, operating at 225 lbs. pressure. The catalyst cake on the filter is washed with an additional quantity of the same hydroformate fraction, and the washed filter cake is removed by a screw conveyor to a drying vessel. A hydrogen gas atmosphere of at least 200 pounds is maintained throughout the system. The regenerated catalyst in this drying vessel passes countercurrently to a stream of hydrogen at 900° F., and is resuspended therein in a form of suspension suitable for being supplied directly as make-up to the original hydroforming reaction.

It will be understood that the specific low temperatures, low pressures, and wash oil concentrations shown by way of example in the catalyst washing and recovery steps of the above illustration and explanation of the drawing are in no way limiting to the practice of this invention. Thus, various temperatures below about 500° F. may be suitable for the operation of cold settler 32, although temperatures somewhat lower than this are preferred for the filtering operation. Particular advantage may be found for carrying out this operation at or near ordinary room temperatures, so as to be below the flash point of the mixture of wash oil and slurry oil present while filtering. In this case a cold slurry may be withdrawn from the settler, and reslurried before filtering.

While hydrogen pressures of about 200 pounds gauge or more have been described as present in the system at all times, to avoid reforming more coke on the regenerated catalyst in the presence of slurry oil, it will be understood that pressures somewhat lower than this can be employed in the filtering or catalyst drying vessels if the high boiling pasting oil has first been thoroughly washed out of the catalyst slurry by a suitable low boiling wash oil. On the other hand, the use of an extraneous wash oil may be dispensed with partly or entirely in some cases if there is enough light condensate available from the hydrogenation stage to wash the residual pasting oil from the hot thickened slurry removed from the primary settler. Thus, under various circumstances, the wash oil described may be added to scrubber 66, directly to line 27 joining the hot slurry from settler 16, or to the cool slurry in settler 16, or only to the wet coke on filter drum 42. The wash oil supplied at these places may be fresh, recycled, or mixed with various amounts of the high boiling slurry oil, depending upon the point in the system from which it is withdrawn. In general, of course, the mixtures recycled will be only those having relatively low concentrations of slurry oil, and only low boiling oil is used for the final washing steps. Thus, for example, line 44 withdrawing mixed wash oil and slurry oil from filter 40 may actually be several lines, in which case the purest wash oil may be returned via line 61 for the countercurrent washing operation in settler 32.

Scrubber 66, described above as operating at the pressure of the primary settler, can also be operated at an intermediate pressure level or at the lower pressure level of cold settler 32. In this case the condensate line from the scrubber may be combined with the slurry from line 25 at an intermediate stage of pump 30, or in line 31 connecting this pump to settler 32. Line 67 would then lead correspondingly to an intermediate stage in pump 6, or to the feed line entering this pump. This arrangement gives a somewhat less pure hydrogen recycle gas, and the amount of methane and other light gases in this recycle stream can be varied by controlling the pressure in scrubber 66 as well as the total amount and composition of the wash oil or wash oil mixture supplied thereto as absorption oil.

Having thus described the invention, it is clear that it is subject to a number of useful variations and modifications without departing from the scope of the following claims.

What is claimed is:

1. The process of regenerating a spent highly active hydroforming catalyst comprising platinum on an alumina base which comprises satisfactorily regenerating said platinum catalyst without oxidative treatment by suspending said catalyst in a high boiling naphthenic oil, hydrogenating said suspension in the liquid phase for a period of at least 10 seconds to 10 minutes at a hydrogen partial pressure of between about 1,000 and 10,000 pounds per square inch at temperatures of between about 600° and 900° F., settling said hydrogenated suspension, replacing said high boiling oil from the hydrogenated suspension by washing with at least an equal volume of a low boiling saturated wash oil in a hydrogen atmosphere at a temperature below 500° F., removing said low-boiling wash oil by drying in a hot hydrogen-containing gaseous atmosphere and recovering dry regenerated catalyst particles therefrom.

2. The process of regenerating a spent highly active hydroforming catalyst comprising platinum on an alumina base which comprises satisfactorily regenerating said platinum catalyst without oxidative treatment by suspending said catalyst in a high boiling naphthenic oil and hydrogenating said suspension in a liquid phase at a hydrogen partial pressure of between about 1,000 and 10,000 pounds per square inch for at least a period of 10 seconds to 10 minutes at temperatures of between about 600° and 900° F., separating out from the hydrogenated suspension a thickened slurry of regenerated catalyst and a stream of substantially catalyst-free clarified oil, recycling said clarified oil with additional spent catalyst to the hydrogenation zone, combining said thickened slurry with at least an equal volume of a low-boiling wash oil, cooling and depressurizing the resultant thin suspension to a reduced superatmospheric pressure at a temperature of below about 250° to 500° F. at which said wash oil remains in the liquid phase, while maintaining a hydrogen partial pressure of at least 200 p. s. i. at all times in the presence of high boiling suspending oil, recovering from said thin suspension a wet cake of regenerated catalyst, washing said wet cake with additional fresh wash oil in a hydrogen atmosphere to remove residual suspending oil therefrom, recovering from said washed cake regenerated catalyst particles essentially free of suspending oil, drying said catalyst particles in a hot hydrogen-containing gas, and recovering said dry regenerated catalyst in a hydrogen atmosphere.

3. The process of regenerating a platinum on alumina-base catalyst whose activity has become spent by the formation of a carbonaceous deposit thereon during use to catalyze the conversion of hydrocarbons, which comprises satisfactorily regenerating said platinum catalyst without oxidative treatment by hydrogenating a slurry containing finely divided particles of said catalyst for a period of at least 10 seconds to 10 minutes suspended in a high-boiling liquid naphthenic oil at a temperature of between about 600° and 900° F. and at a hydrogen partial pressure of between about 1,000 and 10,000 pounds per square inch, the higher temperatures within this range being employed at the higher hydrogen pressures so as to maintain strongly hydrogenating conditions therein, separating the hydrogenated catalyst from the bulk of said suspending oil while under these conditions in the form of a thickened slurry, cooling and diluting this slurry with at least an equal volume of a low-boiling saturated hydrocarbon stream relatively free of polycyclic hydrocarbon constituents, replacing the residual suspending oil from said slurry by washing with additional amounts of said low-boiling hydrocarbon, releasing the pressure thereon at a temperature below about 200° F. to a hydrogen pressure of from about one atmosphere to 300 pounds per square inch, and drying the catalyst particles from said cooled dilute slurry of regenerated catalyst particles in a hot hydrogen-containing gas.

4. The process of regenerating a platinum on alumina-base catalyst which has become spent by the formation of a carbonaceous deposit thereon during use to catalyze the conversion of hydrocarbons, which comprises satisfactorily regenerating said platinum catalyst without oxidative treatment by suspending said spent catalyst in a high boiling naphthenic suspending oil and hydrogenating said suspension in the liquid phase for a period of at least 10 seconds to 10 minutes at a hydrogen partial pressure of between about 1,000 and 10,000 pounds per square inch and a temperature of between about 600° and 900° F., the higher temperatures within this range being employed at the higher hydrogen pressures so as to maintain strongly hydrogenating conditions, separating out from the hydrogenated suspension a thickened slurry of regenerated catalyst, a stream of clarified oil, and a recycle gas stream containing hydrogen and light hydrocarbons, recycling said clarified oil to the hydrogenation zone, cooling and combining said thickened slurry with a low boiling wash oil consisting of saturated hydrocarbons free of polycyclic constituents, releasing the hydrogen pressure on the resultant thin suspension to about 200–300 pounds per square inch, at a temperature below about 500° F. at which said wash oil and residual slurry oil remain in the liquid phase, separating out of said thin suspension a second thickened slurry of washed regenerated catalyst and a second stream of clarified oil, fractionating said second clarified oil to recover wash oil and suspending oil therefrom, filtering said second thickened slurry to recover a wet cake of regenerated catalyst, washing said wet cake with fresh wash oil in a hydrogen atmosphere to remove residual suspending oil therefrom, combining the wash oil from said washing step with said first-named thickened slurry, recovering from said washed cake regenerated catalyst particles essentially free of suspending oil, drying said catalyst particles in a hot hydrogen-containing gas and recovering said dry regenerated catalyst in a hydrogen atmosphere.

5. The process according to claim 4 in which said low-boiling wash oil comprises naphtha hydrocarbons in the boiling range from about 200° to 400° F. produced by the partial hydrocracking of the high-boiling suspending oil during said high pressure hydrogenation.

6. The process according to claim 4 in which the wash oil used to wash said filter cake is presaturated with hydrogen, a portion of the wash oil recovered from said filtering operation is used to dilute said first-named thickened slurry prior to said second slurry thickening operation, and another portion of said recovered wash oil is used to scrub a high pressure condensate out of said recycle gas stream to produce a purified hydrogen stream for recycling to the hydrogenation zone.

References Cited in the file of this patent

UNITED STATES PATENTS

| | | |
|---|---|---|
| 2,322,863 | Marschner et al. | June 29, 1943 |
| 2,431,499 | Palmer | Nov. 25, 1947 |
| 2,447,149 | Wier | Aug. 17, 1948 |
| 2,468,508 | Munday | Apr. 26, 1949 |
| 2,472,844 | Munday et al. | June 14, 1949 |
| 2,642,381 | Dickinson | June 16, 1953 |

OTHER REFERENCES

"The Petroleum Engineer," page $C_{30}$, April 1949, copy in "Platforming Fuels," E. F. Nelson.